SOLID-STATE RELAY FOR MARK-SPACE SYSTEM EMPLOYING OSCILLATOR INTERCOUPLING INPUT AND OUTPUT FILTERS PROVIDING SIGNAL ISOLATION AND INTERFERENCE-FREE OUTPUT

Filed Feb. 6, 1964 3 Sheets-Sheet 1

INVENTORS
Richard H. Turja,
Douglas J. Urness
BY
Stevens, Davis, Miller & Mosher
ATTORNEYS INVENTORS
Richard H. Turja,
Douglas J. Urness
BY
Stevens, Davis, Miller & Mosher
ATTORNEYS June 27, 1967 R. H. TURJA ETAL 3,328,600

SOLID-STATE RELAY FOR MARK-SPACE SYSTEM EMPLOYING OSCILLATOR INTERCOUPLING INPUT AND OUTPUT FILTERS PROVIDING SIGNAL ISOLATION AND INTERFERENCE-FREE OUTPUT

Filed Feb. 6, 1964 3 Sheets-Sheet 3

INVENTORS
Richard H. Turja,
Douglas J. Urness

United States Patent Office 3,328,600
Patented June 27, 1967

3,328,600

SOLID-STATE RELAY FOR MARK-SPACE SYSTEM EMPLOYING OSCILLATOR INTERCOUPLING INPUT AND OUTPUT FILTERS PROVIDING SIGNAL ISOLATION AND INTERFERENCE-FREE OUTPUT

Richard H. Turja, Arlington, Va., and Douglas J. Urness, Hyattsville, Md., assignors to Halliburton Company, Duncan, Okla., a corporation of Delaware Filed Feb. 6, 1964, Ser. No. 342,899
10 Claims. (Cl. 307—88.5)

This invention relates to a solid state relay and more specifically relates to a high speed switching device having no moving parts, the input and output thereof being isolated from each other and from ground.

Relay circuits in accordance with the prior art are normally of the mechanical type, these relays suffering many undesirable properties which cause them to be unfit for use in many present day applications or undesirable for use in present day devices. Such devices include telegraphy systems that eventually feed a code printer stage. It is known in the art that the presence of square waves, transient spike signals, and high amplitude high harmonics are undesirable in the system because these types of signals have a tendency to radiate and interfere with other circuits within the system. Some of the undesirable properties of the mechanical relay include low speed, wear and attendant low life due to the existence of moving parts, lack of isolation of ground between the input and the output and input and output impedances that are not substantially entirely resistive, R.F. radiation due to the high amplitude of the higher harmonics found in the transient signal resulting from the closing of the mechanical contacts. Said radiation is detrimental to the security of a particular code handling apparatus or it could significantly interfere with the printers in a telegraphic system.

Thus it would be desirable to use a relay that could perform the function of wave shaping as well as the switching function and still maintain a D.C. isolation between its control circuit and its contacts. But all these functions cannot be performed by the mechanized relay due to its obvious inherent limitations of arcing and transient and square wave production.

In accordance with the present invention, there is provided a solid state relay which overcomes all of the above-mentioned undesirable properties. In accordance with the present invention, there is provided a solid state relay which is a high speed switching device, which is completely solid-state, having no moving parts, which has isolation of the input and output from each other and from ground, which is capable of operating with either positive or negative grounded systems, which reduces both radiated and conducted interference and which has substantially resistive input and output impedance, and has wave shaping capabilities.

Briefly, the solid state relay comprises an input circuit, an input RF filter coupled thereto, an oscillator coupled to the RF filter, a detector for detecting the output of the oscillator, a detector RF filter and an output circuit. The unusually high maximum keying speed and the D-C isolation between the input and output of the relay is provided by the use of solid state devices in addition to a unique circuit design and mechanical configurations of the package wherein output filtering is provided in the base-drive circuit of the output keying transistor rather than at the collector circuit thereof. This provides filtering at a low level and combines the rectifying and filtering function in a single circuit.

It is therefore an object of the invention to provide a solid state relay having substantially complete isolation between the input and output terminals thereof.

It is a further object of this invention to provide a solid state relay capable of operating with either positive or negative ground systems.

It is a still further object of this invention to provide a solid state relay which reduces both radiated and conducted interference.

It is yet a further object of this invention to provide a solid state relay having a substantially resistive input and output impedance.

Other objects of the invention will become obvious to those skilled in the art from the following description of a preferred embodiment of the invention which is provided by way of example and not by way of limitation, wherein.

Figure 1:
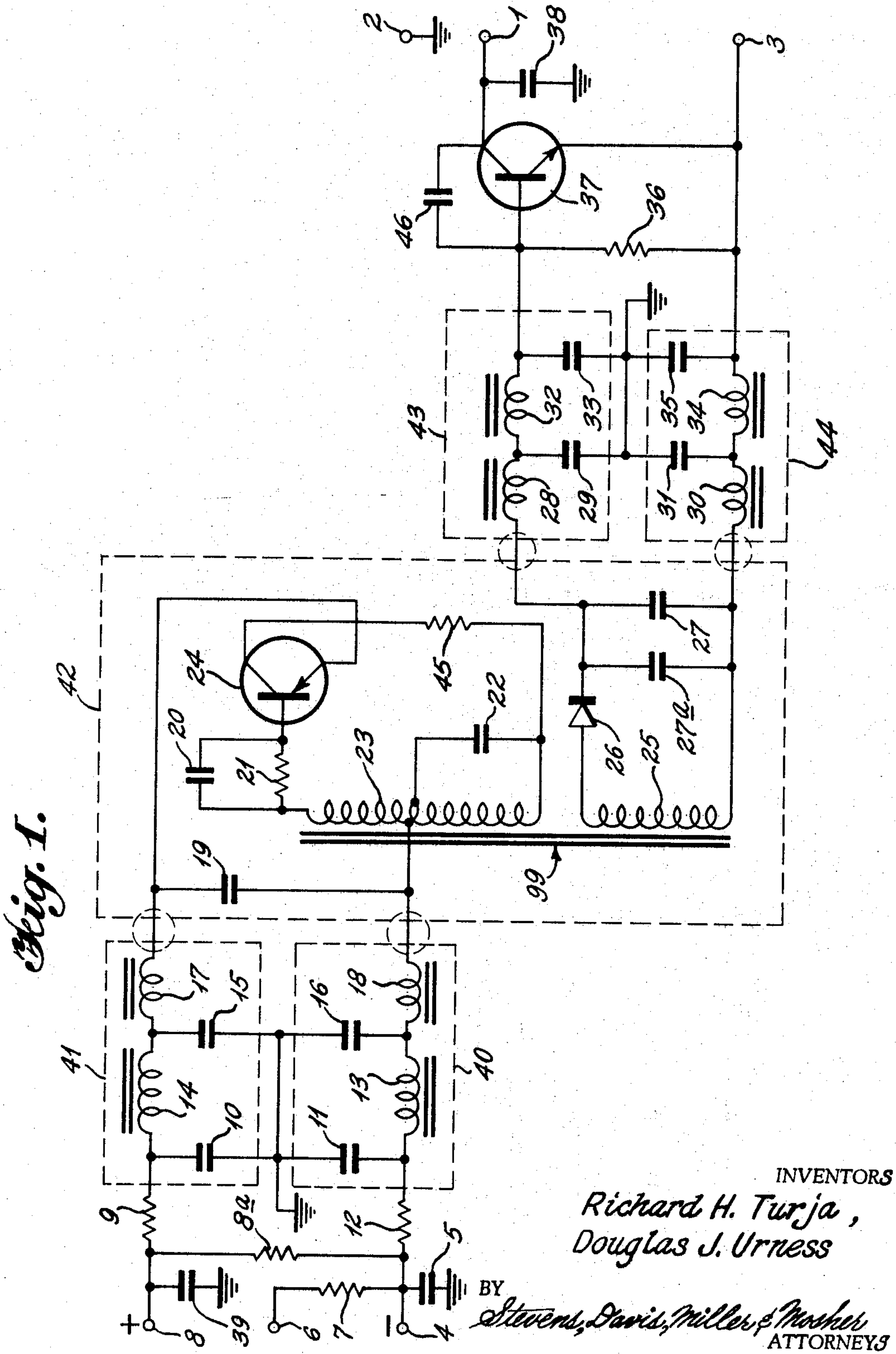
FIG. 1 is a circuit diagram of the solid state relay in accordance with the invention.

Referring to FIG. 1, the input circuit of the solid state relay comprises input terminals 4 and 8 and an alternate input 6 which may be used with terminal 8 when a high current signal is applied, so that the high current input signal does not overdrive oscillator 24. For example, when a signal of about 20 ma. is used, the input comprises terminals 4 and 8. When 60 ma. is used terminals 6 and 8 are strapped together and resistor 7 is placed in shunt with resistor 8*a* to insure constant application of drive current to oscillator. Any number of like resistors can be placed in shunt depending on the desired output current and available input current. This also insures that transistor 7 will not be overdriven and therefore the generation of R.F.I. (radio frequency interference) is maintained at a minimum. Terminals 4 and 8 are coupled by resistor 8*a*. Terminal 8 is coupled to reference potential through capacitor 39, terminal 8 also being coupled through resistor 9 to a filter circuit 41 comprising a capacitor 10 coupled to reference potential, an inductor 14 and a capacitor 15 coupled in shunt with capacitor 14 and an inductor 17 coupled between capacitor 15 and the emitter electrodes of transistor 24.

A similar circuit is coupled to terminal 4 and comprises a capacitor 5 coupled between terminal 4 and reference potential, terminal 4 also being coupled through resistor 12 to a filter circuit 40 comprising a capacitor 11 coupled to reference potential, an inductor 13 and a capacitor 16 coupled in shunt with capacitor 11 and an inductor 18 coupled between capacitor 16 and one electrode of capacitor 19, the other electrode of capacitor 19 being coupled to the emitter electrode of transistor 24.

Inductor 18 is also coupled to an oscillator circuit 42 through capacitor 22 and the shunt connected capacitor 20 and resistor 21 to the base electrode of transistor 24, whereas, the collector electrode thereof is connected through resistor 45 and winding 23 of transformer 99 to the junction of capacitor 22 and resistor 21.

The oscillator circuit has a frequency of approximately 2 megacycles and consequently the leads connecting filters 40 and 41 to the respective leads of capacitor 19 must be short to prevent substantial variation due to feedback from the oscillator 42.

The secondary winding 25 of transformer 99, inductively coupled to winding 23, is connected through diode 26 and capacitor 27 in a loop circuit. The terminals of capacitor 27 are each connected to a similar filter circuit 43 and 44, circuit 43 comprising an inductor 28 and capacitor 29 connected between one capacitor terminal and reference potential while inductor 32 and capacitor 33 are coupled as a circuit in shunt with capacitor 29.

Similarly, the second terminal of capacitor 27 is coupled to filter circuit 44 through inductor 30 and capacitor 31 coupled to reference potential. Inductor 34 and capacitor 35 are connected across capacitor 31. The output of filter circuit 43 is connected to the base electrode of transistor 37 whereas the output of filter circuit 44 is connected through resistor 36 to the same base electrode and also directly to the emitter electrode of this transistor 37. The base electrode of transistor 37 is coupled to the collector electrode thereof through capacitor 46. The output from the relay circuit is taken from the collector electrode of transistor 37 and across capacitor 38 coupled to ground. The circuit also includes an auxiliary reference potential terminal 2 at the output thereof connected to an external auxiliary reference source. All remaining sources of reference potential are coupled to the brass or copper members of the package (to be explained below).

The leads connecting capacitor 27 to filters 43 and 44 must also be of short dimension to avoid undesirable R.F. radiation as pointed out above.

The operation of the solid state relay is as follows:

An input signal appears across terminals 4 and 8 or terminals 6 and 8 depending upon the current amplitude of said signal. It can be seen that the input signal is used as the driving voltage for the oscillator section.

The input R.F. filter section comprises filters 40 and 41. Each filter comprises two half section constant-K low-pass L-C filters and one half section low-pass R-C filter placed in each of the input leads to the oscillator 42. This pair of symmetrical filter circuits determine the cut-off frequency of the system. Capacitor 19 and capacitors 5 and 39 are utilized to further reduce the conducted interference.

The oscillator 42 is a modified Hartley, tuned base design. The tuned circuit comprises the center tapped primary winding 23 coupled to the junction of inductor 18 and capacitor 22. The resistor 21 and capacitor 20 in the base circuit of transistor 24 is utilized for temperature stabilization and the resistor 45 is used to increase the stability and amplitude of the oscillator.

The function of the transformer comprising coils 23 and 25 is to isolate the input circuit from the output circuit and also to act as part of the tuned circuit of the oscillator.

The output of transformer winding 25 is an alternating current which is half wave rectified by rectifier 26 and filtered by capacitor 27. Capacitor 27 functions to establish the D.C. rectified voltage while capacitor **27*a* functions to bypass and filter high frequency voltage. These functions result from the respective values of capacitors 27 and 27*a*. The voltage rectified by the diode is also transmitted to filter circuits 43 and 44** where a steady D.C. voltage is provided by the rectifier. This rectified voltage has the oscillator ripple voltage impressed thereupon.

The filter circuits 43 and 44 comprise one full section constant-K low-pass L-C filter and one half section constant-K low-pass L-C filter in each of the rectifier output leads.

The output from the pair of symmetrical filter circuits 43 and 44 is used to key or trigger transistor switch 37, this transistor being chosen to operate with low output current and high output current.

Resistor 36 establishes the operating point of the transistor 37 whereas capacitor 38 acts as a filter for the output lead 1. If additional wave shaping is necessary or desired, a conventional filter section (not shown) could be used between outputs 1 and 3.

More specifically, a D-C input marking signal across terminals 4 and 8 will be filtered in filter circuits 40 and 41, the filtered signal being applied to the transistor 24 of oscillator 42. The oscillator will be "on" when an input is provided and "off" when no input is provided. The oscillator output is rectified by diode 26 and filtered by filter circuits 43 and 44 and then applied to keying transistor 37 to operate this switch.

Each of the filter circuits 40, 41, 43 and 44 are shielded from each other and sealed in order to reduce the radiated interference. The shielding would comprise copper or brass boxes or cans.

Figures 2, 3, 4:
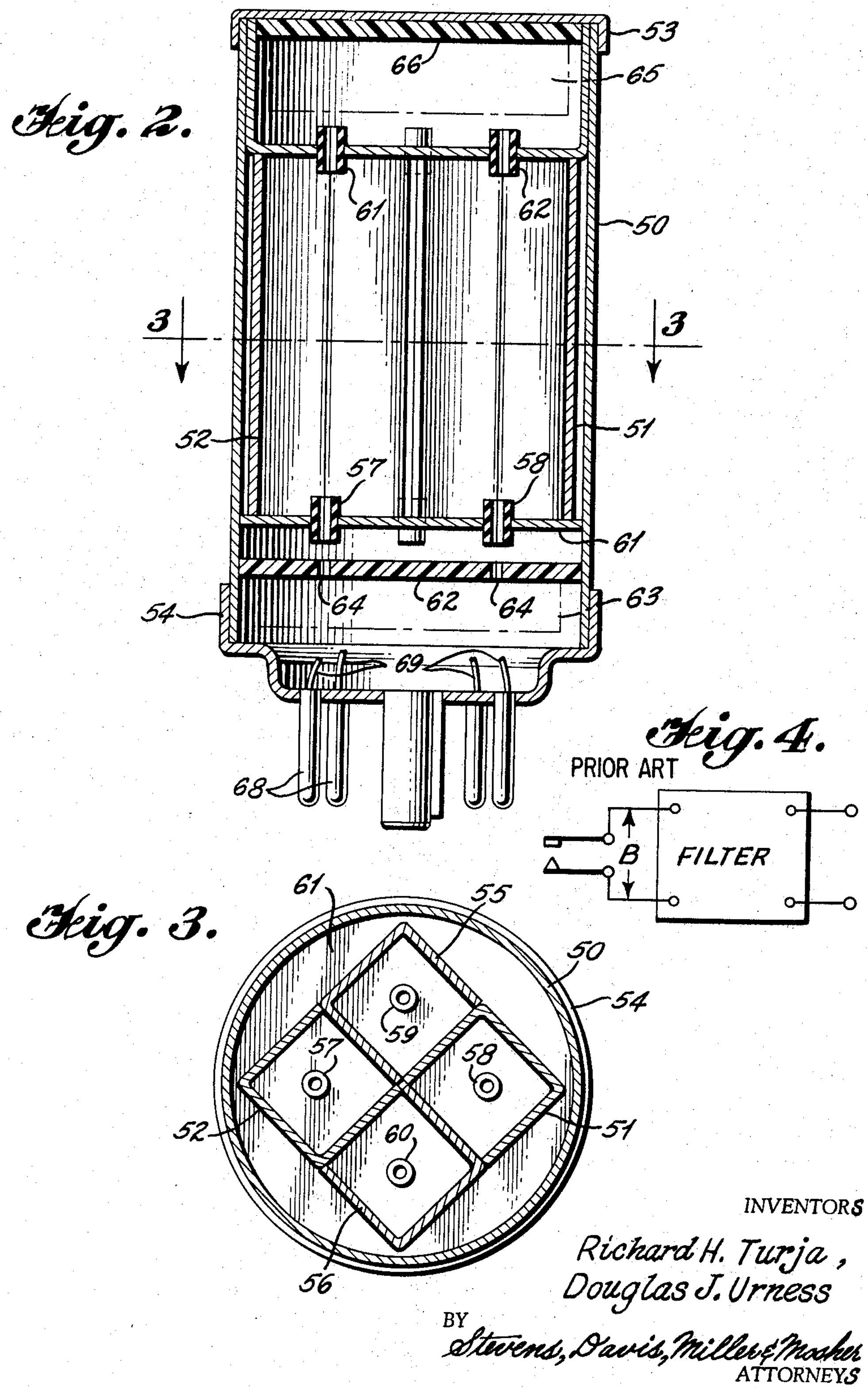
FIG. 2 is a view in cross-section of the package comprising the circuit of FIG. 1 in accordance with this invention.
FIG. 3 is a view taken along the line 3—3 of FIG. 2.
FIG. 4 is a view of the prior art.

FIG. 4 shows a representation of the prior art which uses a low pass filter to prevent the transients from the closing and opening contacts from entering the related circuits. Note that when the contacts are opened, high voltage is impressed across the filter components. Therefore, the components thereof must be designed to withstand such high voltages and still be able to filter the relatively low valued transients.

This disadvantage is avoided with the present invention because the circuit is designed such that the low-pass filter is located before the relay in the signal path and not after said relay. Thus the filter need not associate with the external circuit connected to terminals 1 and 3 and the loop voltage at terminal 1 can be directly applied to said external circuit.

Figure 5:
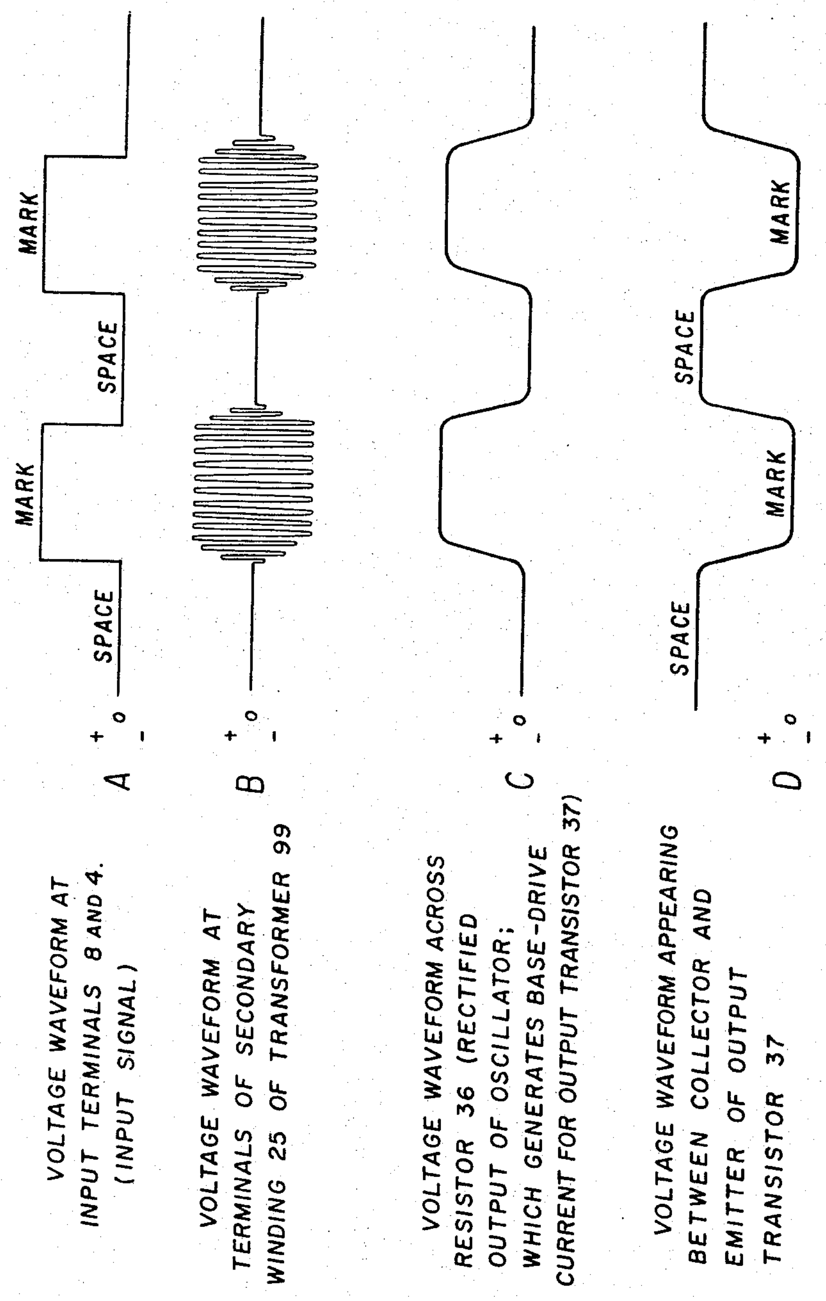
FIG. 5 shows wave forms of various signals within the circuits.

Besides providing for the passage of low frequencies (and filtering high frequencies from the oscillator section) filters 43 and 44 also function to shape the trigger signal to increase the rise and fall time of the transistor 37, a function unavoidable to a mechanical relay. As shown in FIGURE 5, in accordance with the present invention, when a space-mark signal A is applied as an input signal across the input terminals 8 and 4; a voltage waveform B will be produced at the terminals of secondary winding 25 of transformer 99; a voltage waveform C will be produced across resistor 36, and a voltage waveform D will appear between the collector and emitter of the output transistor 37.

Referring now to FIGS. 2 and 3 there is shown the casing for the solid state relay in accordance with this invention wherein an outer copper or brass cylindrical member 50 is sealed within a cap 53 and a base member 54. Mounted within the cylindrical member 50 is a circular insulating member 62 upon which, and in the region 63, the input and output circuitry is mounted. The insulating member 62 includes a plurality of apertures 64 therein adapted to accommodate therein conductors passing between the input or output circuits and one of the filter circuits housed in rectangular boxes 51, 52, 55 and 56. These rectangular boxes are positioned between a first apertured disc 61 and a second apertured member 67. Each of said boxes has but three walls as shown in FIG. 3.

Rectangular boxes 51 and 52 house filter circuits 40 and 41, respectively, while rectangular boxes 55 and 56 house filter circuits 43 and 44 respectively. This cross or diagonal positioning of similar filter circuits is designed to substantially eliminate interference between the similar filter circuits. Each of the rectangular boxes has openings 57 to 60 thereinto at the bottoms thereof provided in member 67 to accommodate conductors passing from the circuit 63 or the circuit 65.

The space 65 contains the oscillator circuit 42, coils 23 and 25, and capacitors 19, 22, and 27, this circuit being mounted on the circuit insulating member 66 secured within the cylindrical member 50 and within the cap 53.

The base member 54 includes a plurality of pins 68 coupled to wires 69, the wires 69 being coupled to predetermined points on the input and/or output circuits at 63. The pins 68 could be secured to the base member 68 by means of Kovar or other similar glass type hermetic sealers.

As mentioned above, each of the rectangular members 51, 52, 55 and 56, as well as the cylindrical member 50, the cap 53, the base member 54, the disc 61 and the member 67, are composed of a copper or brass composition to provide proper shielding.

The purpose for the particular type of can and box design is to insure an optimum, compact unit and to insure that all R.F. energy is confined and not radiated. Space 65 is located directly above the boxes because the leads from the filters to the oscillator section must be as short as possible to avoid radiation therefrom as pointed out above.

Referring again to FIG. 1, a typical set of parameter values which provide satisfactory results are as follows:

| | |
|---|---|
| Resistors: | |
| **7** | 270 ohms. |
| **8** | 820 ohms. |
| **9, 12, 45** | 22 ohms. |
| **21** | 6.8K ohms. |
| **36** | 2.2K ohms. |
| Capacitors: | |
| **4, 10, 11, 33, 35, 39** | 0.02 $\mu$fd., 150 v., disc capacitor. |
| **15, 16, 29, 31** | Two 0.02 $\mu$fd., 150 v., disc capacitors in parallel. |
| **19, 46** | Two 0.02 $\mu$fd., 12 v., disc capacitors in parallel. |
| **20, 22, 38** | 0.001 $\mu$fd., 300 v., disc capacitor. |
| **27** | 0.047 $\mu$fd., 12 v., disc capacitor. |
| **27*a*** | 0.220 $\mu$fd., 12 v., disc capacitor. |
| Inductors **13, 14, 17, 18, 28, 30, 32, 34** | 2.2 mh. subminiature inductor. |
| Diode **26** | JAN IN270 diode. |
| Transistor **24** | 2N414. |
| Transistor **37** | ST4291. |
| Transformer **99** | Transformer, iron core, PRI–29 T No. 30 CT two layers SEC–11 T No. 32. |

Though the invention has been described with respect to a specific embodiment, many variations will become obvious to those skilled in the art. It is therefore the intention that the claims be interpreted as broadly as possible in view of the prior art.

We claim:

1. A solid state relay for a mark and space signal system, designed for D.C. isolation and interference-free operation, comprising, an oscillator means for generating a signal upon receipt of said mark signals and generating no output upon receipt of a space signal, a pair of input terminals, a first filter means connected between said input terminals and said oscillator for reducing radiated and conducted interference resulting from a marking signal input and for isolating said input terminal from said oscillator, a second filter means for reducing radiated and conducted interferences coupled to the output of said oscillator, and a signal powered solid state switch coupled to said second filter means providing an output, said first filter means, said oscillator means and said second filter means combining to provide means to isolate said input terminal from said output.

2. A solid state relay for a mark and space signal system, designed for D.C. isolation and interference free operation, comprising, an input loop and an output loop, said input loop including an input section, a first filter circuit means coupled thereto, and an RF oscillator coupled to said first filter circuit which operates when a D.C. input marking signal is provided across the input section and is off when none is provided, said first filter circuit means including means for preventing any detectable radiated and conducted interference from passing to the oscillator from the input section or passing from the oscillator to the input section, a transformer having a primary winding which forms a part of said oscillator and a secondary winding which forms a part of said output loop coupling and provides direct current isolation between said loops, said output loop also including a rectifier circuit coupled to the secondary winding of the transformer for rectifying the signals induced therein by said primary winding, output filter means coupled to said rectifier circuit for filtering said rectified signal, and a signal powered output switch coupled to said filter means for producing an output signal therein.

3. A solid state relay as defined in claim 2 wherein said output switch is a transistor.

4. A solid state relay circuit as defined in claim 3 wherein said output filter means includes means for increasing the rise and fall time of the switching of said transistor.

5. A solid state relay circuit as defined in claim 4, wherein said output filter means includes a pair of symmetrical low pass filters and a source of reference potential, each of said filters being connected to said source of reference potential.

6. A solid state relay as defined in claim 5 wherein said input filtering means includes a low pass filter.

7. A solid state relay as defined in claim 5 wherein said input filter circuit means includes a pair of symmetrical low pass filters and a source of reference potential, each of said filters of said input filter circuit means being connected to said source of reference potential of said input filter circuit means.

8. A solid state relay as defined in claim 7 wherein each said low pass filter is secured in a separate box consisting of a material taken from the class consisting of copper or brass and wherein each said box is positioned at one of the corners of a square, each said input filter being positioned diagonally across from the other input filter and each output filter being positioned diagonally across from the said other output filter.

9. A solid state relay as defined in claim 7 including a shielding arrangement having a casing consisting of a material taken from the class consisting of copper and brass sealed by a cap and base member, said casing having at least a first, a second, and third compartments in which are mounted said oscillator means and said rectifier circuit, said input filter means and said output filter means, and said input and said output switch, respectively, said compartments having apertures in the walls thereof to accommodate conductors connecting the items in the various compartments.

10. A solid state relay as defined in claim 9 wherein each said low pass filter is secured in a separate box consisting of a material taken from the class consisting of copper or brass and wherein each said box is positioned at one of the corners of a square, each of said input filters being positioned diagonally across from the other said input filter and each of said output filters being positioned diagonally across from said other output filter.

References Cited

UNITED STATES PATENTS

| | | | |
|---|---|---|---|
| 2,855,574 | 10/1958 | Salmon | 333—79 |
| 2,966,586 | 12/1960 | Cole et al. | 329—206 |
| 2,990,444 | 6/1961 | Peterson | 178—69 |
| 3,192,484 | 6/1965 | Carroll | 307—88.5 |
| 3,243,510 | 3/1966 | Winston | 307—88.5 X |

ARTHUR GAUSS, *Primary Examiner.*

J. HEYMAN, *Assistant Examiner.*